(12) United States Patent
Goldstein et al.

(10) Patent No.: US 7,308,049 B2
(45) Date of Patent: Dec. 11, 2007

(54) METHOD AND APPARATUS FOR NONCOHERENT SIGNAL PROCESSING IN PILOTLESS WIRELESS SYSTEMS

(75) Inventors: Yuri Goldstein, Southbury, CT (US); Yuri Okunev, Southbury, CT (US)

(73) Assignee: PCTEL, Inc., Milpitas, CA (US)

( * ) Notice: Subject to any disclaimer, the term of this patent is extended or adjusted under 35 U.S.C. 154(b) by 785 days.

(21) Appl. No.: 10/772,962

(22) Filed: Feb. 5, 2004

(65) Prior Publication Data
US 2005/0175124 A1 Aug. 11, 2005

(51) Int. Cl.
*H03D 3/22* (2006.01)
(52) U.S. Cl. ............... 375/330; 375/341; 375/229; 329/304; 332/103
(58) Field of Classification Search ............ 375/330, 375/341, 229; 329/304; 332/103
See application file for complete search history.

(56) References Cited

U.S. PATENT DOCUMENTS 5,610,949 A * 3/1997 Petranovich ............ 375/330
6,345,076 B1 * 2/2002 Petersen et al. ......... 375/341
2005/0008101 A1 * 1/2005 Kazi et al. ............. 375/330
2005/0111590 A1 * 5/2005 Fang et al. ............. 375/330

OTHER PUBLICATIONS

Digital Communications; Fourth Edition; by John G. Proakis; McGraw Hill, 2000.
"Multiple-Symbol Differential Detection of MPSK"; by Dariush Divsalar and Marvin K. Simon, 1999 IEEE.

* cited by examiner

*Primary Examiner*—Chieh M. Fan
*Assistant Examiner*—Eva Zheng
(74) *Attorney, Agent, or Firm*—Gordon & Jacobson, P.C.

(57) ABSTRACT

Methods, apparatus and systems for implementing an algorithm for N-symbol noncoherent processing of M-ary DPSK signals in a pilotless, wireless system is provided. The algorithm is carried out with (N−1) recurrent steps (iterations) plus a decision step. Each iterative step includes simple trigonometrical transformation of quadrature components of the current symbol and summation of the transforms with results of the previous step. A final N-symbol decision regarding the current transmitted symbol corresponds to the vector of maximum length, calculated after the (N−1)-th step of the iterative procedure. The general algorithm is optionally implemented with one or more intersymbol processors, one or more memory blocks for saving results of the intersymbol processors, and a decision block. In addition, shift registers for quadrature components of the received signal may be utilized.

42 Claims, 9 Drawing Sheets

METHOD AND APPARATUS FOR NONCOHERENT SIGNAL PROCESSING IN PILOTLESS WIRELESS SYSTEMS

BACKGROUND OF THE INVENTION

1. Field of the Invention

The present invention relates to telecommunications. The invention more particularly relates to wireless telecommunications apparatus, systems and methods which implement data transmission via a plurality of telecommunication channels such as radio channels with variable parameters, including multipath wireless channels. More specifically, the invention relates to pilotless wireless systems with mobile transmitters and/or receivers, although it is not limited thereto.

2. State of the Art

Development of pilotless data transmission and signal processing is an important problem of wireless system design. Pilotless wireless systems provide the highest real data rate by utilizing system capacity exclusively for data transmission and providing all receiving functions without any accompanying pilot signals.

One manner of implementing a pilotless system is using coherent demodulation based on a reference signal and extracting all necessary information from signals-bearing data. In this case, precise estimation and tracking of the carrier phase plays a critical role. A conventional approach to carrier phase estimation is described in John Proakis, "Digital Communications", McGraw Hill, Fourth Edition, 2000, Sections 6.2.4-6.2.5 which is hereby incorporated herein in its entirety. A new method of carrier phase tracking was proposed in co-owned U.S. Ser. No. 10/628,943 filed Jul. 29, 2003, and entitled "Pilotless, Wireless, Telecommunications Apparatus, Systems and Methods" which is also hereby incorporated by reference herein in its entirety. In that invention, phase tracking is based on reducing and averaging differential quadrature components of received symbols.

Coherent processing, based on carrier phase tracking, provides the maximum possible performance in channels with comparatively slow phase changing and comparatively high signal-to-noise ratio (SNR). If one of those conditions is not satisfied, the coherent demodulator loses its advantages. For example, when the bit error rate BER>0.01, phase estimation becomes less precise. The SNR penalty depends on the method of phase tracking but it may reach 1-2 dB. However, much more performance loss can be caused by fast phase changing or, especially, phase jumping. Fast phase changing and phase jumping are typical phenomenon in communications involving mobile clients because in the mobile environment the multipath configuration may change instantly. This change can cause coherent detection degradation even at a comparatively high SNR because any phase tracking algorithm, based on symbol averaging, is not capable of instantly estimating the phase changing. As a result, the coherent receiver provides a long sequence (burst) of errors after phase jumping even at a comparatively high SNR. This is the reason why wireless system designers consider approaches other than coherent processing for pilotless systems.

For multipath radio channels in a mobile environment, a promising manner of implementing a pilotless system involves the utilization of noncoherent signal processing which does not need any information about the initial phase of the reference signal and consequently does not require phase tracking at all. In the case of phase modulation, noncoherent processing can be only used in combination with Differential Phase Shift Keying (DPSK) in contrast to coherent processing which can be used with both DPSK and PSK. As is emphasized in Dariush Divsalar, and Marvin Simon, "Multiple-Symbol Differential Detection of MPSK", IEEE Transactions on Communications, vol. 38, N3, March 1990 (which is hereby incorporated by reference in its entirety), for multipath channels with fast phase changing, a DPSK-with-noncoherent-processing scheme is the only way to provide robust data transmission.

Conventional noncoherent DPSK processing includes a two-symbol interval for making a decision. With a two-symbol interval, if a phase jump occurs during the symbol interval, only one error will take place. However, two-symbol non-coherent DPSK suffers from a performance penalty when compared to ideal coherent DPSK. For example, at BER=$10^{-5}$ the penalty is about 0.75 dB for DBPSK (Differential Binary PSK), and about 2.2 dB for DQPSK (Differential Quadrature PSK). For M-ary DPSK (DMPSK) the penalty increases with increasing M.

A well-known way to mitigate the performance loss of the non-coherent receiver and preserving its advantages is to increase the interval of the non-coherent processing. This approach, known as multisymbol non-coherent detection (or processing) was considered in the previously incorporated article by Dariush Divsalar, and Marvin Simon. The conventional approach to multisymbol processing is based on allowing the observation interval over which symbol decisions are made to be more than a two-symbol interval while at the same time making a joint decision on several symbols simultaneously as opposed to symbol-by-symbol decisions. An obvious disadvantage of the joint decision on several symbols is the additional symbol delay which results in the receiver. In addition, the joint decision procedure is undesirable for some decoding algorithms.

SUMMARY OF THE INVENTION

It is therefore an object of the invention to provide pilotless telecommunication systems and associated methods and apparatus, which transmit data by means of DPSK modulation of carriers and which provide all receiving functions based on multisymbol noncoherent processing of carriers.

It is another object of the invention to provide general methods and apparatus for multisymbol noncoherent processing in single-carrier and multi-carrier systems with symbol-by-symbol decisions.

It is a further object of the invention to provide relatively simply implementable algorithms for multisymbol noncoherent processing of M-ary DPSK modulated signals.

It is an additional object of the invention to provide simple iterative algorithms of multisymbol noncoherent processing of DPSK modulated signals, when each next symbol may be simply combined with a result of previous symbol processing(s).

Another object of the invention is to provide pilotless wireless telecommunication systems, apparatus, and methods which provide all receiving functions without pilot signals by means of multisymbol noncoherent processing with symbol-by-symbol decisions which are based on iterative algorithms.

In accord with the above objects which will be discussed in more detail below, the present invention provides methods, and apparatus for the realization of pilotless telecommunication systems, which use the entire system capacity exclusively for data transmission, and which provide all receiving functions based on an iterative multisymbol noncoherent processing of carriers with symbol-by-symbol decision-making.

According to the invention, a method or algorithm is provided for 3-symbol noncoherent processing of M-ary DPSK (DMPSK) modulation with an arbitrary set of phase differences. The preferred algorithm is a three-step procedure. The first two steps are iterative, with the first step being the calculation of two-symbol quadrature components, and the second step being the calculation of three-symbol quadrature components of final three-symbol vectors. The lengths of the vectors are then compared in the third step to find the maximum. The algorithm is preferably implemented with a 3-symbol DPSK-signal noncoherent demodulator which utilizes intersymbol processors, memory registers and a decision block.

The preferred algorithm of the invention has a desirable iterative structure in that the 3-symbol quadrature components are sums of the previous 2-symbol components and transformed quadrature components of the current symbol. The preferred algorithm of the invention provides the ability to make a symbol-by-symbol decision and/or a joint decision on two symbols simultaneously.

According to another aspect of the invention, a simplified algorithm for 3-symbol noncoherent processing of DQPSK signals is provided.

According to a further aspect of the invention, a general algorithm for N-symbol noncoherent processing of M-ary DPSK signals is provided. The general algorithm is carried out with (N-1) recurrent steps (iterations) plus a decision step. Each iterative step includes a simple trigonometrical transformation of quadrature components of the current symbol and a sum of the transforms with the results of the previous step. A final N-symbol based decision regarding the current transmitted symbol corresponds to the vector of maximum length, calculated after the (N−1)-th step of the recurrent procedure. The general algorithm is optionally implemented with (N−1) intersymbol processors, (N−2) pairs of memory blocks for saving results of the intersymbol processors, a decision block, and two shift registers for quadrature components of the received signal. Alternatively, a single processor may be used for all functions of the intersymbol processors, and one or more memory blocks may used to implement the memory blocks and shift registers.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
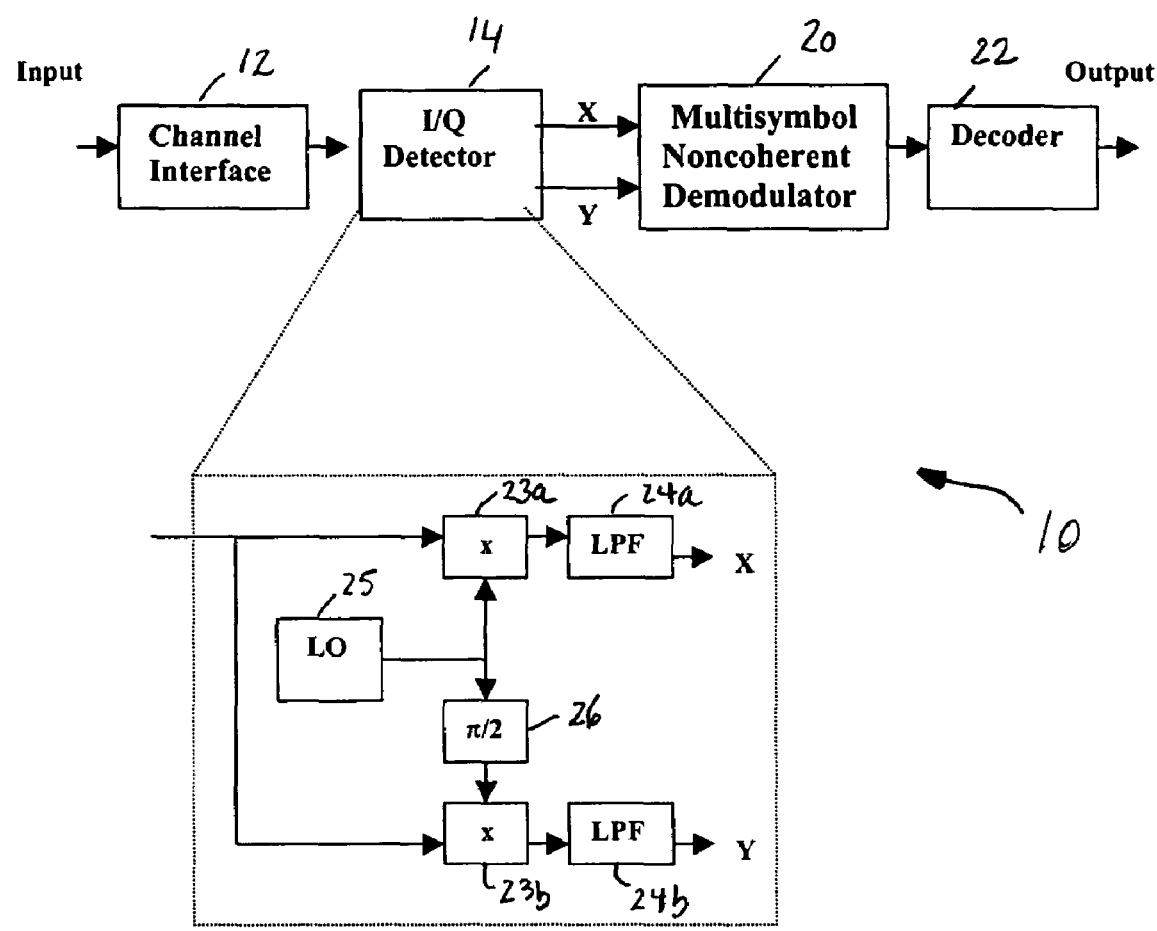
FIG. 1 is a high level block diagram of a single carrier receiver incorporating a multisymbol noncoherent demodulator according to the invention.

Turning now to FIG. 1, a block diagram of a single carrier receiver 10 is shown. Receiver 10 includes a channel interface 12, an in-phase/quadrature (I/Q) detector 14, a multisymbol noncoherent demodulator of the invention 20, and a decoder 22. In the case of a wireless system, the channel interface 12 typically includes an antenna, a low noise amplifier, and possibly a signal transformer which transforms the signal to an intermediate frequency. The I/Q detector 14 typically includes two multipliers $23a$, $23b$, two low pass filters $24a$, $24b$, a local oscillator 25, and a phase rotator 26. As is well known in the art, the I/Q detector takes the signal (possibly, the intermediate frequency signal) from the channel interface and provides quadrature components X, Y to the demodulator 20. Determinations of the demodulator 20 are provided to the decoder 22. According to the invention, different implementations of channel interfaces, I/Q detectors and decoders may be utilized as are known in the art.

Figure 2:
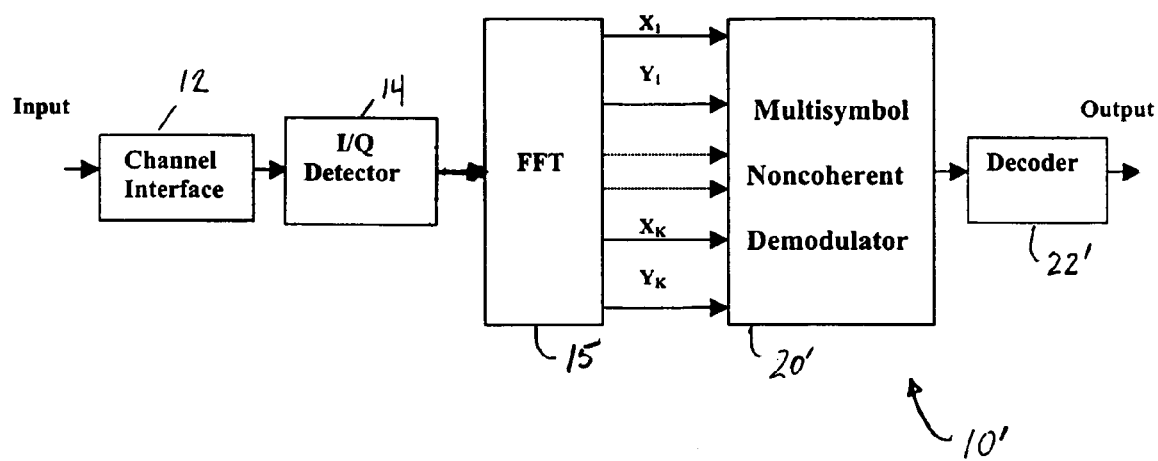
FIG. 2 is a high level block diagram of a multicarrier receiver incorporating a multisymbol noncoherent demodulator according to the invention.

A block diagram of an OFDM (orthogonal frequency division multiplexed) multicarrier receiver 10' is shown in FIG. 2. Receiver 10' includes a channel interface 12, an I/Q detector 14, a fast Fourier transformer (FFT) 15, a multisymbol noncoherent demodulator of the invention 20', and a decoder 22'. The channel interface 12 preferably includes the same elements as in the single carrier system of FIG. 1. The FFT 15 provides quadrature components of all carriers for the received signal. The output of the FFT is a set of quadrature components $X_{cn}$, and $Y_{cn}$ for carrier numbers (cn)=1,2, ..., L where L is the number of carriers of the multicarrier system. The multisymbol noncoherent demodulator 20' processes each pair of quadrature components in parallel or in a consecutive manner depending on desired implementation. The output of the demodulator 20' is provided to decoder 22'. Again it will be appreciated that different implementations of channel interfaces, I/Q detectors, Fourier transformers (or equivalents), and decoders may be used as are known in the art.

Prior to turning to the figures showing the noncoherent demodulators of the invention, a discussion of the theoretical underpinnings of the demodulators of the invention is useful. First, it is desirable to consider 2-symbol and 3-symbol noncoherent processing of M-ary DPSK (DMPSK) modulation with a set of phase differences $$\Delta(k); k=1, 2, \ldots, M. \qquad (1)$$

In particular, define X(q) and Y(q) as the quadrature components (real and imaginary parts) of the received signal at the q-th symbol interval, where q=1, 2, 3, . . . It should be noted that quadrature components X(q) and Y(q) are results of the convolution of the received signal and the reference signal, or results of a Discrete Fourier Transform (DFT) of the received signal based on a certain reference signal. For purposes of this discussion it is assumed that the frequency of the reference signal is equal or "close enough" to the frequency of the received signal. This means that the system preferably provides some sort of frequency offset compensation, which is one of the conventional receiver functions. Frequency offset compensation allows a receiver to mitigate SNR degradation in the case of single carrier systems and avoid intercarrier interferences in the case of multicarrier OFDM systems.

With these circumstances, the decision-making procedure for conventional 2-symbol processing comprises two operations. The first operation is the calculation of the 2-symbol quadrature components $VX_2$ and $VY_2$ for all versions of the transmitted phase differences $\Delta(k)$ according to:

$$VX_2(k_1)=X(q-1)+X(q)\cos[\Delta(k_1)]+Y(q)\sin[\Delta(k_1)], \quad (2a)$$

$$VY_2(k_1)=Y(q-1)+Y(q)\cos[\Delta(k_1)]-X(q)\sin[\Delta(k_1)], \quad (2b)$$

where q=2, 3, . . . ; and $k_1$=1, 2, . . . , M.

In equations (2a) and (2b), the consequent (current) symbol is reduced to the most likely preceding symbols. It is possible to use the inverse transformation: reduction of the preceding symbol into the most likely consequent symbols. Which option is utilized depends on the direction of the phase difference reading, but the final result of the decision making will be the same. In the following, reduction of the consequent symbol into the possible preceding symbols is utilized.

The second operation for conventional 2-symbol processing is finding the index "$k_1$" corresponding to the maximum vector length:

$$\max\{[VX_2(k_1)]^2+[VY_2(k_1)]^2\}; k_1=1, 2, \ldots, M. \quad (3)$$

It is noted that M sets of quadrature values are calculated in the first operation, and the M values in the square brackets of (3) are compared to find the maximum.

According to the invention, a symbol-by-symbol decision-making algorithm for a 3-symbol processing interval starts with the determination of the quadrature components $VX_2$ and $VY_2$. These components in the 3-symbol case, for the q-th, (q-1)-th and (q-2)-th symbols are equal to $$VX_2(k_1)=X(q-2)+X(q-1)\cos[\Delta(k_1)]+Y(q-1)\sin[\Delta(k_1)], \quad (4a)$$

$$VY_2(k_1)=Y(q-2)+Y(q-1)\cos[\Delta(k_1)]-X(q-1)\sin[\Delta(k_1)]. \quad (4b)$$

Variables $UX_3$ and $UY_3$ can now be defined corresponding to the transformation of the quadrature components X(q) and Y(q) of the current q-th symbol for each possible combination of phase differences $\Delta(k_1)$ between the (q-2)-th and (q-1)-th symbols, and $\Delta(k_2)$ between the (q-1)-th and q-th symbols according to:

$$UX_3(k_1,k_2)=X(q)\cos[\Delta(k_1)+\Delta(k_2)]+Y(q)\sin[\Delta(k_1)+\Delta(k_2)] \quad (5a)$$

$$UY_3(k_1,k_2)=Y(q)\cos[\Delta(k_1)+\Delta(k_2)]-X(q)\sin[\Delta(k_1)+\Delta(k_2)]. \quad (5b)$$

Now, to find the 3-symbol quadrature components $VX_3$ and $VY_3$, transforms (5) are added to the previously calculated values (4):

$$VX_3(k_1, k_2)=VX_2(k_1)+UX_3(k_1, k_2); \quad (6a)$$

$$VY_3(k_1, k_2)=VY_2(k_1)+UY_3(k_1, k_2). \quad (6b)$$

Finally, a decision is made by finding a maximum:

$$\text{Max}\{[VX_3(k_1, k_2)]^2+[VY_3(k_1, k_2)]^2\}, \quad (6c)$$

where $k_1$=1, 2, . . . , M, and $k_2$=1, 2, . . . , M.

So, the algorithm for 3-symbol processing interval can be described as a three step procedure: the first step is calculating 2-symbol quadrature components $VX_2$ and $VY_2$ according to equations (4a) and (4b), and the second step is calculating 3-symbol quadrature components $VX_3$ and $VY_3$ according to equations (6a) and (6b). The third step is making a decision by finding the maximum value according to equation (6c).

According to equations (6a) and (6b), M components of $VX_3$ and M components of $VY_3$ are calculated for each component $VX_2$ and $VY_2$, i.e., $M^2$ of pairs ($VX_3$, $VY_3$) can be determined. According to the invention, the $M^2$ pairs of vector lengths are then compared to find the maximum according to equation (6c). For example, in the case of DQPSK (as discussed below), sixteen pairs of ($VX_3$, $VY_3$) are calculated and compared.

Two additional notes should be made regarding equations (6a)-(6c). First, equations (6a) and (6b) have a desirable iterative structure in that the 3-symbol quadrature components $VX_3$, $VY_3$ are the sums of the previous 2-symbol components $VX_2$, $VY_2$ and the transformed quadrature components of the current symbol. Second, the decision algorithm (6c) may be used for both a symbol-by-symbol decision and/or a joint decision on two symbols simultaneously. In the case of a symbol-by-symbol decision, maximization in (6c) is provided through indexes $k_2$, corresponding to phase differences between the (q-1)-th and q-th symbols. In the case of the joint symbol decision, maximization in (6c) is provided through the whole set of indexes $k_1$ and $k_2$, corresponding to two sets of phase differences: i.e., the phase difference between the (q-2)-th and the (q-1)-th symbols, and the phase difference between the (q-1)-th and the q-th symbols.

To reiterate, according to the invention, an algorithm for a 3-symbol noncoherent processing of DMPSK telecommunications signals can be described as follows:

a) Three consecutive symbols with indexes q, (q-1) and (q-2) are used to participate in making a decision relative to the current (q-th) symbol, and the corresponding quadrature components of those signals X(q) and Y(q), X(q-1) and Y(q-1), X(q-2) and Y(q-2) are saved;

b) Quadrature components X(q-1),Y(q-1) and X(q-2),Y(q-2) are transformed into a set of 2-symbol quadrature components $VX_2$ and $VY_2$ according to equations (4a) and (4b) using each possible phase difference $\Delta(k_1)$, where $k_1$=1, 2, . . . , M;

c) Quadrature components X(q) and Y(q) of the current symbol are transformed into a set of transforms $UX_3(k_1, k_2)$ and $UY_3(k_1, k_2)$ according to equations (5a) and (5b) for each possible combination of phase differences $\Delta(k_1)$ and $\Delta(k_2)$, where $k_1$=1,2, . . . , M and $k_2$=1,2, . . . , M;

d) Sets of 3-symbol quadrature components $VX_3(k_1, k_2)$ and $VY_3(k_1, k_2)$ are combined by adding the results of b) and c) according to equations (6a) and (6b);

e) A final decision relative to the current (q-th) symbol is the phase difference of the set of differences $\Delta(k_2)$, where $k_2=1, 2, \ldots, M$, corresponding to the maximum length of vectors $[VX_3(k_1, k_2), VY_3(k_1, k_2)]$, according to equation (6c).

Figure 3:
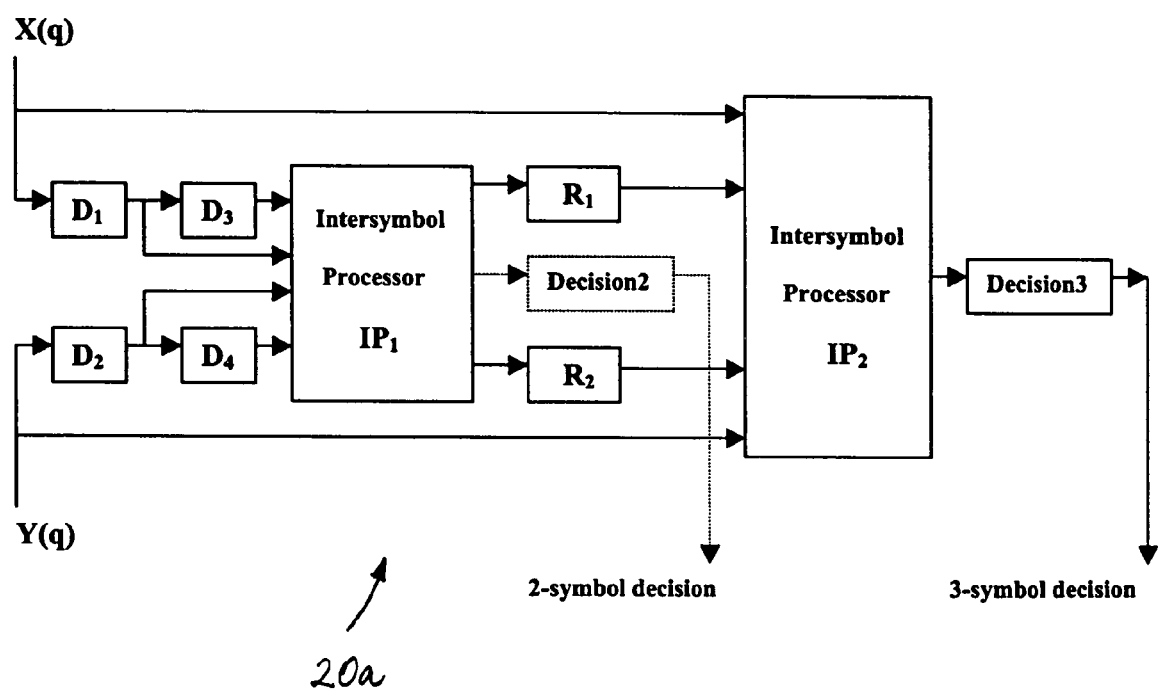
FIG. 3 is a schematic diagram of a 3-symbol noncoherent demodulator of DPSK signals according to the invention.

FIG. 3 shows a schematic diagram of the 3-symbol noncoherent demodulator of DPSK signals 20a (corresponding to demodulator 20 of FIG. 1, or 20' of FIG. 2) according to the invention, operating according to a) through e) above. In particular, The demodulator 20a of the invention includes four identical delay elements $D_1$, $D_2$, $D_3$ and $D_4$ with delay times equal to symbol length T, two memories $R_1$ and $R_2$, two intersymbol processors $IP_1$ and $IP_2$, and 3-symbol decision block Decision3.

The demodulator 20a operates as follows. Quadrature components X(q) and Y(q) of the q-th received symbol are directly fed to intersymbol processor $IP_2$ and through delay elements $D_1$-$D_4$, to intersymbol processors $IP_1$. In $IP_1$, two adjacent symbols (X(q−1),Y(q−1)) and (X(q−2),Y(q−2)), preceding the current symbol (and found in the delay elements $D_1$, $D_2$, $D_3$ and $D_4$), are processed according to equations (4a) and (4b) or according to Table 1 (below) for DQPSK (as described hereinafter) to generate M pairs of numbers $VX_2$ and $VY_2$ which are stored in memories $R_1$ and $R_2$, respectively. In the case of DQPSK (as described below), the memories $R_1$ and $R_2$ store four numbers for $VX_2$ and four numbers for $VY_2$. The numbers $VX_2$ and $VY_2$ from memories $R_1$ and $R_2$ together with current symbol (X(q),Y(q)) are fed to $IP_2$, where they are processed according to equations (5a), (5b) and (6a), and (6b) (or according to Tables 5a and 5b for DQPSK as described below). Intersymbol processor $IP_2$ generates numbers $VX_3$ and $VY_3$ which are fed to the decision block Decision3, where a decision is made according to equation (6c). In the case of DQPSK, as described below, sixteen pairs of numbers ($VX_3$, $VY_3$) participate in the decision making procedure.

According to one aspect of the invention, equations (6a) and (6b) may be considerably simplified in certain circumstances. In particular, in DQPSK modulation systems, a typical set of phase differences are:

$$\Delta(k)=(0, \pi/2, \sigma, 3\pi/2). \qquad (7)$$

With that limited set of phase differences, values $VX_2$ and $VY_2$ calculated according to equations (4a) and (4b) can be reduced as suggested in Table 1.

From Table 1 it can be seen that the calculation of values $VX_2$ and $VY_2$ are reduced to simple combinations (summation or subtraction) of quadrature components of the adjacent received symbols.

Table 2 contains possible values of the sum $(\Delta(k_1)+\Delta(k_2))$ modulo $2\pi$ found in the square brackets of equations (5a) and (5b) for the DQPSK demodulator with phase differences (7).

TABLE 2

All combinations of $[\Delta(k_1) + \Delta(k_2)]$ modulo $2\pi$ for DQPSK.

| $k_1$ | $k_2$ | | | |
|---|---|---|---|---|
| | 1 | 2 | 3 | 4 |
| 1 | 0 | $\pi/2$ | $\pi$ | $3\pi/2$ |
| 2 | $\pi/2$ | $\pi$ | $3\pi/2$ | 0 |
| 3 | $\pi$ | $3\pi/2$ | 0 | $\pi/2$ |
| 4 | $3\pi/2$ | 0 | $\pi/2$ | $\pi$ |

Continuing with equations (5a) and (5b) for DQPSK, Tables 3a and 3b contain sine and cosine functions of the combinations indicated in Table 2:

TABLE 3a $\mathrm{Sin}[\Delta(k_1) + \Delta(k_2)]$

| $k_1$ | $k_2$ | | | |
|---|---|---|---|---|
| | 1 | 2 | 3 | 4 |
| 1 | 0 | 1 | 0 | −1 |
| 2 | 1 | 0 | −1 | 0 |
| 3 | 0 | −1 | 0 | 1 |
| 4 | −1 | 0 | 1 | 0 |

TABLE 3b $\mathrm{Cos}[\Delta(k_1) + \Delta(k_2)]$

| $k_1$ | $k_2$ | | | |
|---|---|---|---|---|
| | 1 | 2 | 3 | 4 |
| 1 | 1 | 0 | −1 | 0 |
| 2 | 0 | −1 | 0 | 1 |

TABLE 1

Values $VX_2$ and $VY_2$ according to equations (4a) and (4b)

| | $k_1$ | | | |
|---|---|---|---|---|
| | 1 | 2 | 3 | 4 |
| $\Delta(k_1)$ | 0 | $\pi/2$ | $\pi$ | $3\pi/2$ |
| $VX_2$ | X(q − 2) + X(q − 1) | X(q − 2) + Y(q − 1) | X(q − 2) − X(q − 1) | X(q − 2) − Y(q − 1) |
| $VY_2$ | Y(q − 2) + Y(q − 1) | Y(q − 2) − X(q − 1) | Y(q − 2) − Y(q − 1) | Y(q − 2) + X(q − 1) |

TABLE 3b-continued $$\text{Cos}[\Delta(k_1) + \Delta(k_2)]$$

| | $k_2$ | | | |
|---|---|---|---|---|
| $k_1$ | 1 | 2 | 3 | 4 |
| 3 | −1 | 0 | 1 | 0 |
| 4 | 0 | 1 | 0 | −1 |

With the sine and cosine functions determined, Tables 4a and 4b contain values for the transforms $UX_3(k_1, k_2)$ and $UY_3(k_1, k_2)$ of equations (5a) and (5b).

TABLE 4a $$UX_3(k_1, k_2) = X(q)\cos[\Delta(k_1) + \Delta(k_2)] + Y(q)\sin[\Delta(k_1) + \Delta(k_2)]$$

| | $k_2$ | | | |
|---|---|---|---|---|
| $k_1$ | 1 | 2 | 3 | 4 |
| 1 | X(q) | Y(q) | −X(q) | −Y(q) |
| 2 | Y(q) | −X(q) | −Y(q) | X(q) |
| 3 | −X(q) | −Y(q) | X(q) | Y(q) |
| 4 | −Y(q) | X(q) | Y(q) | −X(q) |

TABLE 4b $$UY_3(k_1, k_2) = Y(q)\cos[\Delta(k_1) + \Delta(k_2)] - X(q)\sin[\Delta(k_1) + \Delta(k_2)]$$

| | $k_2$ | | | |
|---|---|---|---|---|
| $k_1$ | 1 | 2 | 3 | 4 |
| 1 | Y(q) | −X(q) | −Y(q) | X(q) |
| 2 | −X(q) | −Y(q) | X(q) | Y(q) |
| 3 | −Y(q) | X(q) | Y(q) | −X(q) |
| 4 | X(q) | Y(q) | −X(q) | −Y(q) |

It should be noted that each row in Tables 2-4 is a cyclic shift of the previous row. This fact gives additional opportunity for simplification of the computation procedure as it is necessary to store only four numbers for the computation of the final sixteen numbers.

Finally, using the results from Tables 4a and 4b, Tables 5a and 5b contain the 3-symbol quadrature components $VX_3$ and $VY_3$, calculated according to equations (6a) and (6b).

TABLE 5a $$VX_3(k_1, k_2) = VX_2(k_1) + UX_3(k_1, k_2)$$

| | $k_2$ | | | |
|---|---|---|---|---|
| $k_1$ | 1 | 2 | 3 | 4 |
| 1 | $VX_2(1) + X(q)$ | $VX_2(1) + Y(q)$ | $VX_2(1) − X(q)$ | $VX_2(1) − Y(q)$ |
| 2 | $VX_2(2) + Y(q)$ | $VX_2(2) − X(q)$ | $VX_2(2) − Y(q)$ | $VX_2(2) + X(q)$ |
| 3 | $VX_2(3) − X(q)$ | $VX_2(3) − Y(q)$ | $VX_2(3) + X(q)$ | $VX_2(3) + Y(q)$ |
| 4 | $VX_2(4) − Y(q)$ | $VX_2(4) + X(q)$ | $VX_2(4) + Y(q)$ | $VX_2(4) − X(q)$ |

TABLE 5b $$VY_3(k_1, k_2) = VY_2(k_1) + UY_3(k_1, k_2)$$

| | $k_2$ | | | |
|---|---|---|---|---|
| $k_1$ | 1 | 2 | 3 | 4 |
| 1 | $VY_2(1) + Y(q)$ | $VY_2(1) − X(q)$ | $VY_2(1) − Y(q)$ | $VY_2(1) + X(q)$ |
| 2 | $VY_2(2) − X(q)$ | $VY_2(2) − Y(q)$ | $VY_2(2) + X(q)$ | $VY_2(2) + Y(q)$ |
| 3 | $VY_2(3) − Y(q)$ | $VY_2(2) + X(q)$ | $VY_2(2) + Y(q)$ | $VY_2(2) − X(q)$ |
| 4 | $VY_2(4) + X(q)$ | $VY_2(4) + Y(q)$ | $VY_2(4) − X(q)$ | $VY_2(4) − Y(q)$ |

The components of Tables 5a and 5b provide the basis for making a final decision according to algorithm (6c). In the case of DQPSK there are four possible phase differences, (i.e., the differences set forth in (7)), and for purpose of simplification we can designate the corresponding decisions with numbers 1, 2, 3 and 4. These numbers for the third symbol of 3-symbol DQPSK processing are shown in Table 6. The decision corresponds to the location of the maximum according to equation (6c). This means that if, for example, the maximum of $[VX_3(k_1, k_2)]^2 + [VY_3(k_1, k_2)]^2$ is achieved at $k_2=3$, then the decision is 3. So, for a one-symbol decision it is sufficient to determine a column number in Table 6, in which the maximum of equation (6c) takes place.

TABLE 6

Decisions for the third symbol of 3-symbol processing of DQPSK.

| | $k_2$ | | | |
|---|---|---|---|---|
| $k_1$ | 1 | 2 | 3 | 4 |
| 1 | 1 | 2 | 3 | 4 |
| 2 | 1 | 2 | 3 | 4 |
| 3 | 1 | 2 | 3 | 4 |
| 4 | 1 | 2 | 3 | 4 |

Joint decisions for the second and third symbols of the 3-symbol DQPSK processing are shown in Table 7. As in the previous case, a decision corresponds to location of the maximum according to equation (6c). Thus, for example, if the maximum of $[VX_3(k_1, k_2)]^2 + [VY_3(k_1, k_2)]^2$ is achieved at $k_1=3$ and $k_2=4$, then the decision is 3 for the second symbol, and the decision is 4 for the third symbol. Generally, all sixteen components $[VX_3(k_1, k_2)]^2 + [VY_3(k_1, k_2)]^2$ should be compared to find the maximum.

TABLE 7

Joint decisions for the second and third symbols of 3-symbol processing of DQPSK.

| | $k_2$ | | | |
|---|---|---|---|---|
| $k_1$ | 1 | 2 | 3 | 4 |
| 1 | 1, 1 | 1, 2 | 1, 3 | 1, 4 |
| 2 | 2, 1 | 2, 2 | 2, 3 | 2, 4 |
| 3 | 3, 1 | 3, 2 | 3, 3 | 3, 4 |
| 4 | 4, 1 | 4, 2 | 4, 3 | 4, 4 |

Turning back to the schematic diagram in FIG. 3, it should be appreciated that in the case of DQPSK, the intersymbol processor $IP_1$ provides the computations of Table 1, and the intersymbol processor $IP_2$ provides the computations of Tables 5.

Figure 4:
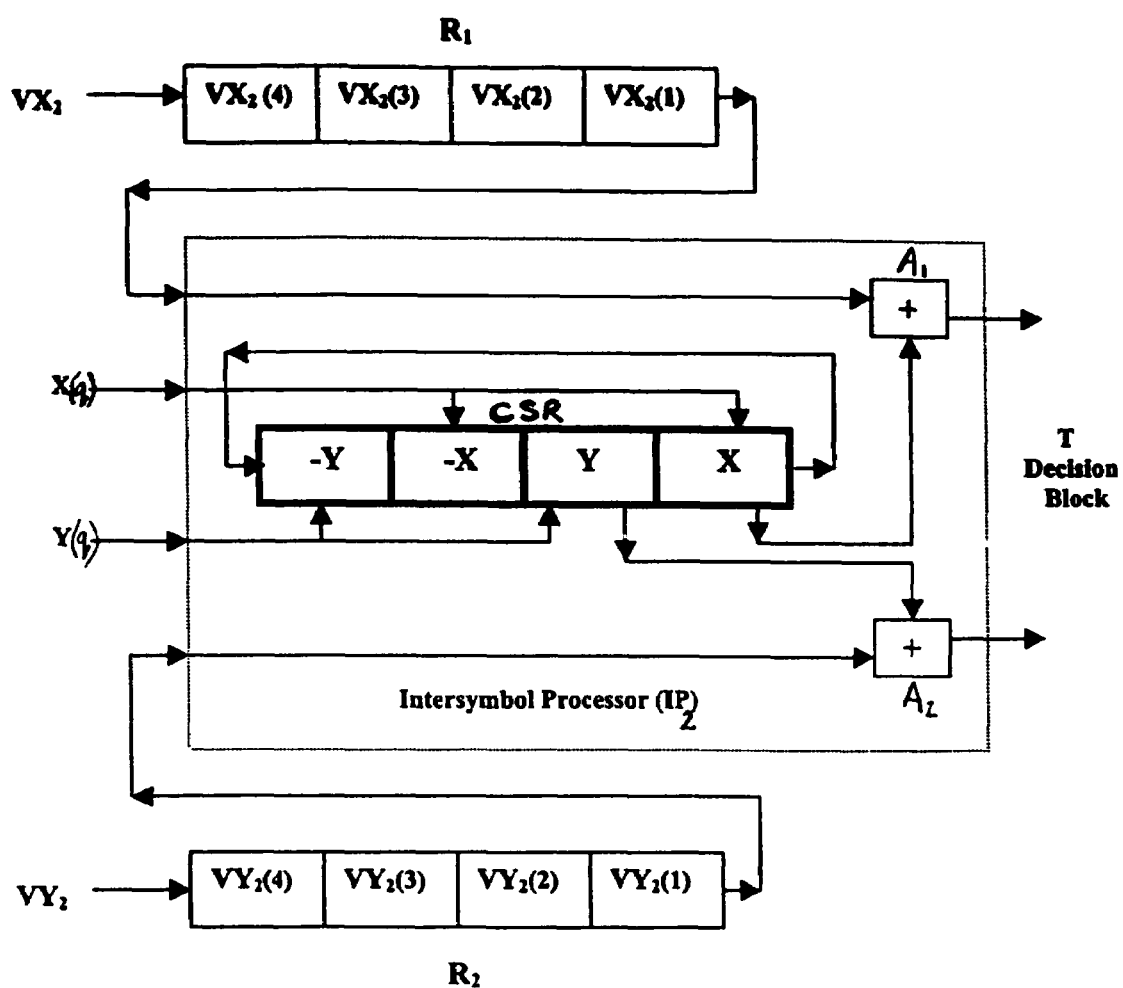
FIG. 4 is a schematic diagram of the intersymbol processor and memory registers of the 3-symbol noncoherent demodulator of FIG. 3.

FIG. 4 shows additional details of the intersymbol processor $IP_2$ and memories $R_1$ and $R_2$ for the 3-symbol noncoherent demodulator of DQPSK signals. The intersymbol processor $IP_2$, shown within dotted lines, includes a four-cell circular shift register (CSR) and two adders $A_1$ and $A_2$. Memories $R_1$ and $R_2$ are four-cell shift registers. As seen in FIG. 4, there are four signals received at the input to the memories $R_1$ and $R_2$ and to intersymbol processor $IP_2$ including: the current quadrature components $X(q)$ and $Y(q)$ of the received signal, and numbers $VX_2$ and $VY_2$ from the output of the previous intersymbol processor $IP_1$. Numbers $X(q)$ and $Y(q)$ are saved in the four cells of the CSF as positive and negative values as indicated in FIG. 4 and as required by Tables 4a and 4b. In addition, four numbers $VX_2$ are saved in register $R_1$ and four numbers of $VY_2$ are saved in register $R_2$, all of which are output from intersymbol processor $IP_1$.

The calculation procedure in the intersymbol processor $IP_2$ consists of four cycles, each cycle having four subcycles. During the four subcycles of a first cycle, the first components of $VX_2$ and $VY_2$ are sequentially summed in the adders $A_1$ and $A_2$ with all four elements of the CSR (with the numbers in the CSR circularly shifting or rotating between each subcycle). The first cycle generates the first rows of Tables 5a and 5b. As seen in FIG. 4, the addition of $VX_2$ and $VY_2$ with numbers in the CSR is done in parallel, with $VX_2$ being added to the number in the last cell of the CSR, and $VY_2$ being added to the next-to-last cell of the CSR. After the first cycle, the numbers in the shift registers $R_1$ and $R_2$ are shifted such that the next component of $VX_2$ and $VY_2$ may be sequentially summed in the adders $A_1$ and $A_2$ with all four elements of the CSR to provide the next line of Tables 5a and 5b. The process continues until all four components of $VX_2$ and $VY_2$ stored in registers $R_1$ and $R_2$ are added with all four elements of the CSR according to Tables 5a and 5b. After each cycle, numbers in shift registers $R_1$ and $R_2$ are shifted, setting free space for the next symbol data.

Figure 5:
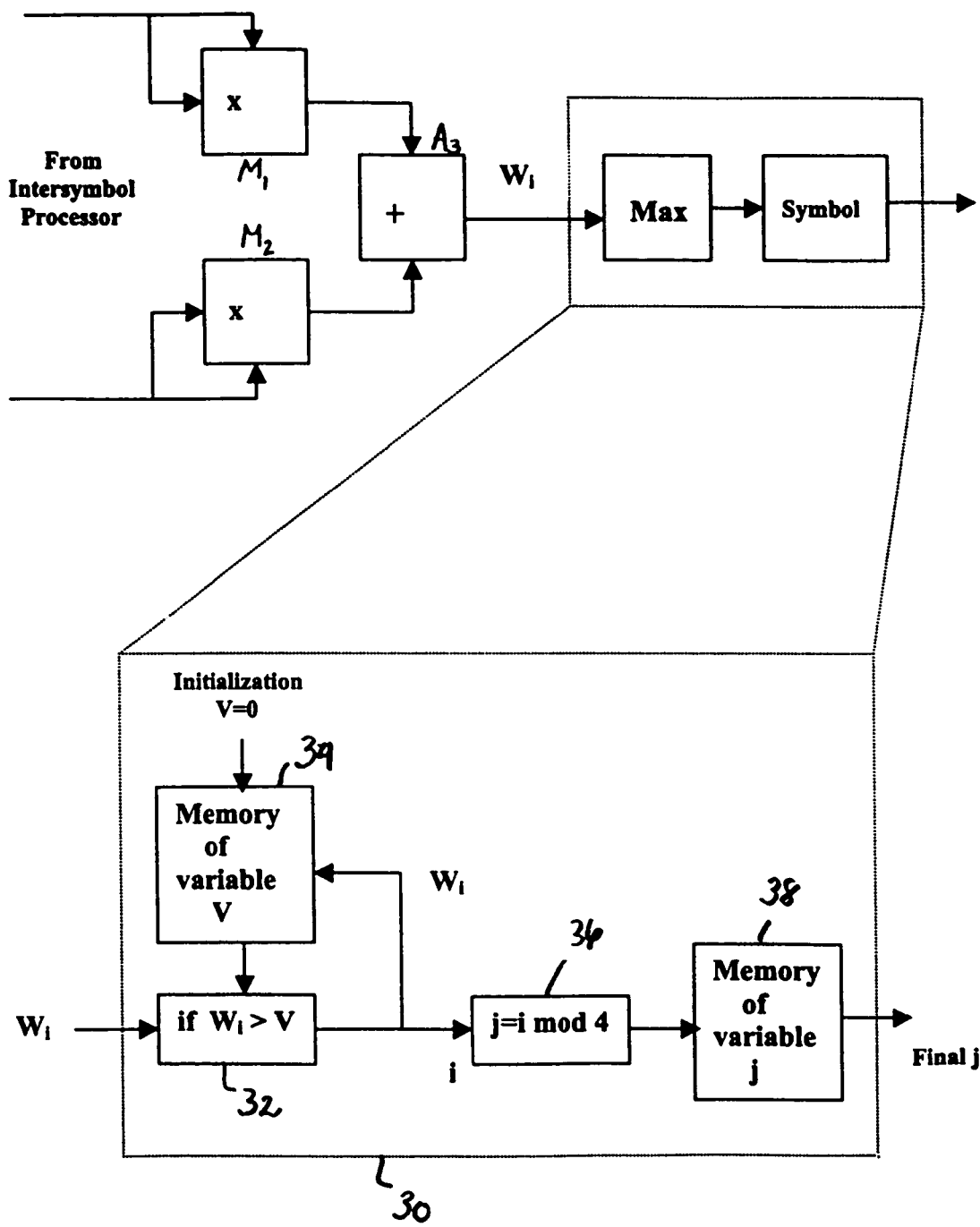
FIG. 5 is a schematic diagram of the decision block of the 3-symbol noncoherent demodulator of FIG. 3.

The results of the interprocessor $IP_2$ is to provide sixteen sets of values $(VX_3, VY_3)$ for the decision block. FIG. 5 shows a schematic diagram of the decision block. Two numbers at a time from the output of the intersymbol processor $IP_2$ are fed to squarers or multipliers $M_1$ and $M_2$, the outputs of which are then combined in an adder $A_3$ in order to implement relationship (6c). The resulting sequence of numbers $W_i$ from the output of the adder $A_3$ is fed to a logic element 30 which compares each incoming number to a variable V which is initialized as V=0. If at comparator 32, the current number $W_i$>V, then V is replaced by $W_i$ in a memory 34 of variable V. In total, sixteen numbers $W_i$ are compared in the case of the 3-symbol processing of DQPSK signals to find the maximum value. If a decision for only the third symbol is desired, the index "i" of number $W_i$ at the output of the comparator 32 can be transformed at 36 into j=i mod4 such that each new number "j" replaces the previous one in a memory 38 of variable j. According to Table 6, the final value of variable "j" is the desired decision for the third symbol. However, for a joint two-symbol decision (i.e., decisions for the second and third symbols), logic unit 30 should operate according to Table 7, with index "i" defining both $k_1$ and $k_2$ in order to provide a decision for a single element of Table 7 with maximum value $W_i$. Thus, for example, if $W_7$ proved to be a maximum, $k_1=2$ and $k_2=3$, the decision would be 2 for the second symbol and 3 for the third symbol. Similarly, if $W_9$ proved to be a maximum, $k_1=3$ and $k_2=1$, the decision would be 3 for the second symbol and 1 for the third symbol.

Given the above, it will be appreciated by those skilled in the art that the invention can be generalized to provide a symbol-by-symbol decision making algorithm for M-ary DPSK at an N-symbol processing interval. In particular, consider DPSK modulation with an arbitrary set of phase differences. The algorithm of N-symbol processing of the q-th received symbol $X(q),Y(q)$ is carried out with $(N-1)$ recurrent steps (iterations).

Let $VX_{i+1}(k_1, k_2, \ldots, k_i)$ and $VY_{i+1}(k_1, k_2, \ldots, k_i)$ be quadrature components at the i-th step, and $UX_{i+1}(k_1, k_2, \ldots, k_i)$ and $UY_{i+1}(k_1, k_2, \ldots, k_i)$ be transforms of the received symbol at the i-th step, where i=1, 2, ..., N-1. These components and transforms are functions of integer variables $k_1, k_2, \ldots, k_i$, running from 1 to M. Then, transforms $UX_{i+1}(k_1, k_2, \ldots, k_i)$ and $UY_{i+1}(k_1, k_2, \ldots, k_i)$ of the received symbol at the i-th step can be calculated according to the following which is similar to equations (5a) and (5b):

$$UX_{i+1}(k_1, k_2, \ldots, k_i) = X(q-N+i+1)\cos[\Delta(k_1) + \ldots + \Delta(k_i)] + Y(q-N+i+1)\sin[\Delta(k_1) + \ldots + \Delta(k_i)] \quad (8a)$$

$$UY_{i+1}(k_1, k_2, \ldots, k_i) = Y(q-N+i+1)\cos[\Delta(k_1) + \ldots + \Delta(k_i)] - X(q-N+i+1)\sin[\Delta(k_1) + \ldots + \Delta(k_i)], \quad (8b)$$

where q is a symbol number which is currently under the decision making procedure.

Now the i-th step (iteration) of the desired recurrent algorithm can be represented with the following simple formula:

$$VX_{i+1}(k_1, k_2, \ldots, k_i) = VX_i(k_1, k_2, \ldots, k_{i-1}) + UX_{i+1}(k_1, k_2, \ldots, k_i), \quad (9a)$$

$$VY_{i+1}(k_1, k_2, \ldots, k_i) = VY_i(k_1, k_2, \ldots, k_{i-1}) + UY_{i+1}(k_1, k_2, \ldots, k_i), \quad (9b)$$

where i=1,2, ..., N-1, and where $k_i$=1,2, ..., M, and where $VX_1=X(q-N+1)$, $VY_1=Y(q-N+1)$ are quadrature components of the first received symbol in the sequence of N processing symbols.

A final N-symbol decision regarding the q-th transmitted symbol corresponds to the maximum of a calculated vector at the i=(N-1)-th step of the recurrent procedure, i.e.

$$\text{Max}\{[VX_N(k_1, k_2, \ldots, k_{N-1})]^2 + [VY_N(k_1, k_2, \ldots, k_{N-1})]^2\}, \quad (9c)$$

where the maximum is determined through all "k".

It should be noted that decision algorithm (9c), which is similar to algorithm (6c) for 3-symbol processing, may be used for both a symbol-by-symbol decision and a joint decision on (N-1) symbols simultaneously. In the case of a symbol-by-symbol decision, maximization in (9c) is provided through indexes $k_N-1$, corresponding to phase differences between the (N-1)-th and N-th symbols. In the case of the joint symbol decisions, maximization in (8c) is provided through the whole set of indexes $k_1, k_2, \ldots, k_{N-1}$, corresponding to phase differences between all N symbols participating in N-symbol processing procedure.

Figure 6:
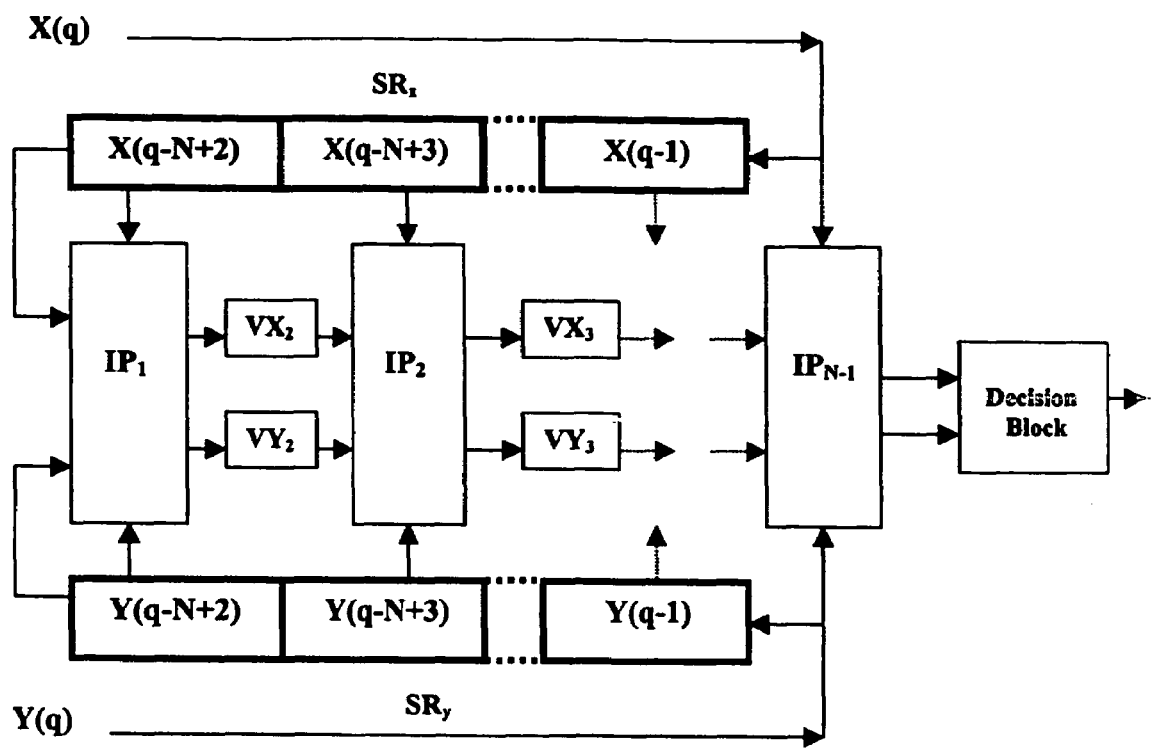
FIG. 6 is a schematic diagram of an N-symbol noncoherent demodulator of DPSK signals according to a second embodiment of the invention.

To reiterate, according to the invention, an N-symbol noncoherent algorithm for DMPSK signals can be described as follows:

a) N consecutive symbols with indexes q, (q-1), ..., (q-N+1) participate in making a decision about the current q-th symbol, and the corresponding quadrature components of the received signals $X(q),Y(q); X(q-1),Y(q-1); \ldots ; X(q-N+1),Y(q-N+1)$ are saved;

b) A set of quadrature components $X(q),Y(q); X(q-1),Y(q-1); \ldots ; X(q-N+1), Y(q-N+1)$ are subjected to a (N-1)-step transformation;

c) The i-th step, where i=1,2, ..., N-1, includes (1) Calculation of multi-dimensional transforms $UX_{i+1}(k_1, k_2, \ldots, k_i)$ and $UY_{i+1}(k_1, k_2, \ldots, k_i)$ of the current received components $X(q-N+i+1)$ and $Y(q-N+i+1)$ according to equations (8a) and (8b); and (2) Calculation of mult-dimensional components $VX_{i+1}(k_1, k_2, \ldots, k_i)$ and $VY_{i+1}(k_1, k_2, \ldots, k_i)$ according to recurrent formulas (9a) and (9b);

d) Final decision relative to the current q-th symbol is the phase difference from the set of differences $\Delta(k_{N-1})$, where $k_{N-1}=1, 2, \ldots, M$, corresponding to the maximum of the length of vectors $[VX_N(k_1, k_2, \ldots, k_{N-1}), VY_N(k_1, k_2, \ldots, k_{N-1})]$, according to algorithm (9c);

Turning now to FIG. 6, a schematic diagram is provided of the N-symbol noncoherent demodulator of DMPSK signals which implements equations (9a) and (9b). The apparatus of FIG. 4 includes (N–1) Intersymbol Processors $IP_1 \ldots IP_{N-1}$; (N–2) pairs of memory blocks $VX_2, VY_2 \ldots VX_{N-1}, VY_{N-1}$, a Decision block, and two memories for signal quadrature components X and Y, which are depicted as Shift Registers $SR_x$ and $SR_y$.

The apparatus of FIG. 6 operates as follows. Quadrature components of the current received symbol $X(q)$ and $Y(q)$ are directly fed to the $IP_{N-1}$. In addition, component $X(q)$ is inserted into the first (right-hand) cell of $SR_x$, shifting all register elements by one cell from right to left, and component $Y(q)$ is inserted into the first (right-hand) cell of $SR_y$, shifting all register elements by one cell from right to left. As seen in FIG. 6, storage locations of both memory shift registers $SR_x$ and $SR_y$ are connected to corresponding intersymbol processors IP. Each IP, in turn, receives signals from registers $SR_x$ and $SR_y$ as well as results of computations of the previous IP stored in corresponding memories $VX_j$ and $VY_j$. All intersymbol processors provide computations according to equations (8) and (9a) and (9b), but the number of operations carried out by each IP is different. For example, $IP_1$ calculates M complex numbers, and $IP_{N-1}$ calculates $M^{N-1}$ complex numbers per symbol. Thus, for 4-symbol processing of DQPSK, the first IP will calculate four numbers, while the last IP will calculate sixty-four numbers. As shown above, in the proposed algorithms all computations are simple summing operations of two numbers (see Tables 1-5). A final decision is provided in the Decision block according to algorithm (9c).

It should be appreciated by those skilled in the art that FIG. 6 illustrates only the functions of the proposed multi-symbol noncoherent demodulator and not necessarily its most desirable implementation. Indeed, there are numerous ways to implement the proposed recurrent algorithm of equations (9a) and (9b) and the sequence of operations provided by apparatus in FIG. 4. For example, all operations provided by the individual intersymbol processors of FIG. 6 can be combined in a single high-speed intersymbol processor. Likewise, all memory and shift register storage can be provided in a single block of memory.

Figure 7:
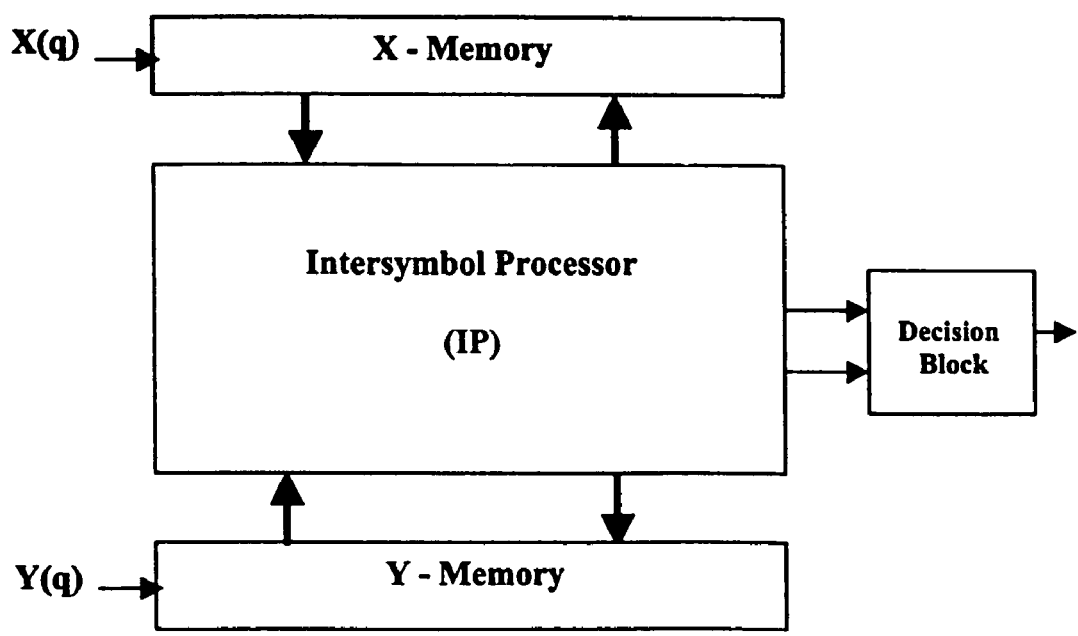
FIG. 7 is a high level schematic diagram of an alternative second embodiment of the invention which utilizes a high speed intersymbol processor in an N-symbol noncoherent demodulator of DPSK signals.

FIG. 7 provides a high level block diagram of an alternative implementation of the multisymbol demodulator of the invention. The apparatus of FIG. 7 includes a single intersymbol processor IP (which may be implemented in a DSP, discrete components, or in software of a general-purpose processor), X-memory and Y-memory blocks (which may be part of a single memory such as a RAM, or separate memory elements), and a Decision block. The X-memory stores components $X(q-N+2), X(q-N+3), \ldots, X(q-1)$ of the received signal as well as intermediate results of intersymbol processing $VX_j$ ($j=2,3,\ldots, N-1$). Similarly, the Y-memory stores components $Y(q-N+2), Y(q-N+3), Y(q-1)$ of the received signal as well as intermediate results of intersymbol processing $VY_j$ ($j=2,3,\ldots, N-1$). The Intersymbol Processor (IP) calculates all intermediate components $VX_j$ and $VY_j$ as well as final values $VX_N$ and $VY_N$ according to equations (8) and (9a) and (9b).

Figure 8:
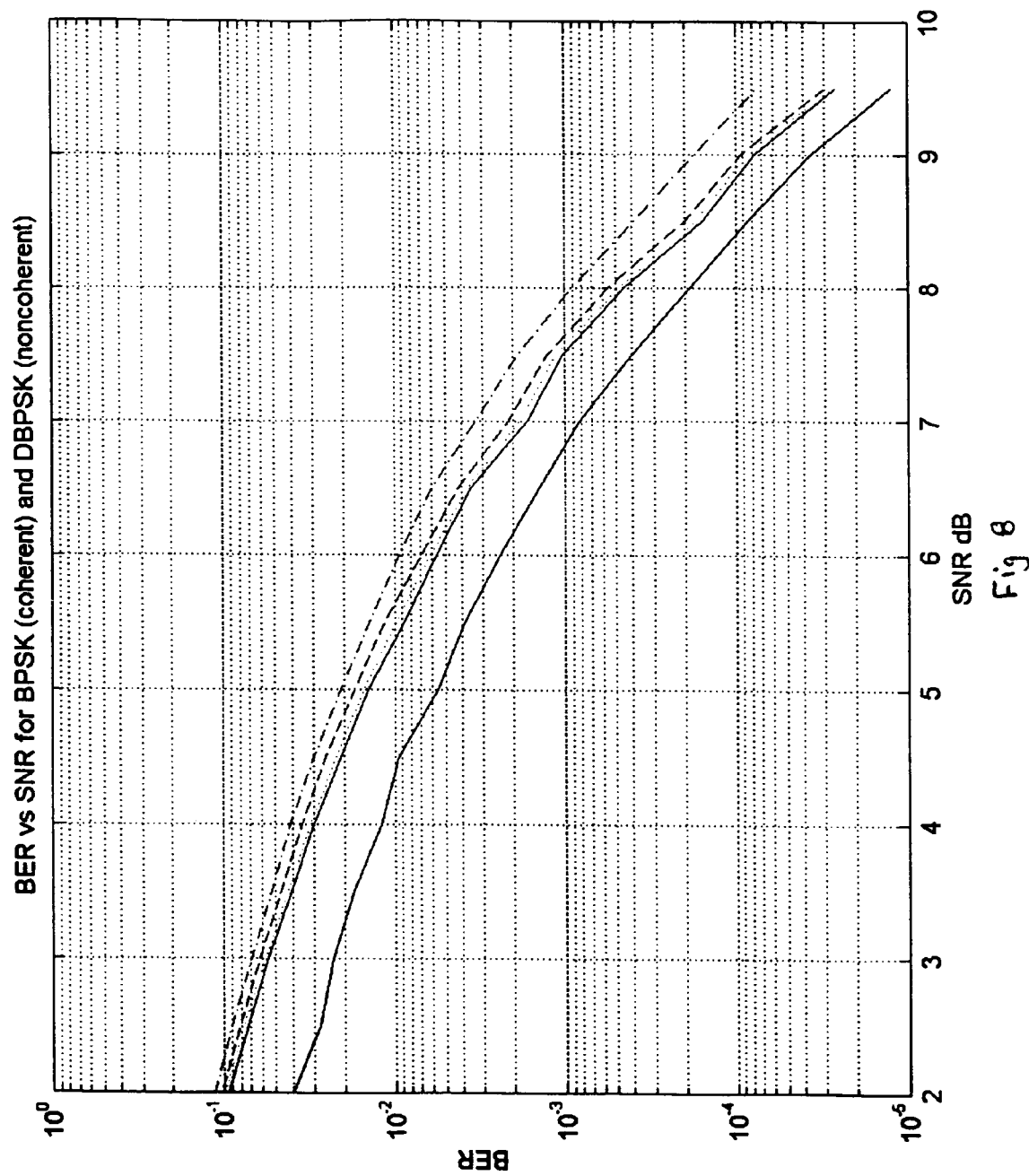
FIG. 8 is a graph showing results of a stochastic simulation of the algorithms of the invention, with the bit error rate (BER) plotted as a function of signal-to-noise ratio (SNR) for DBPSK modulation and noncoherent processing with 2, 3, 4, and 5-symbol intervals.
Figure 9:
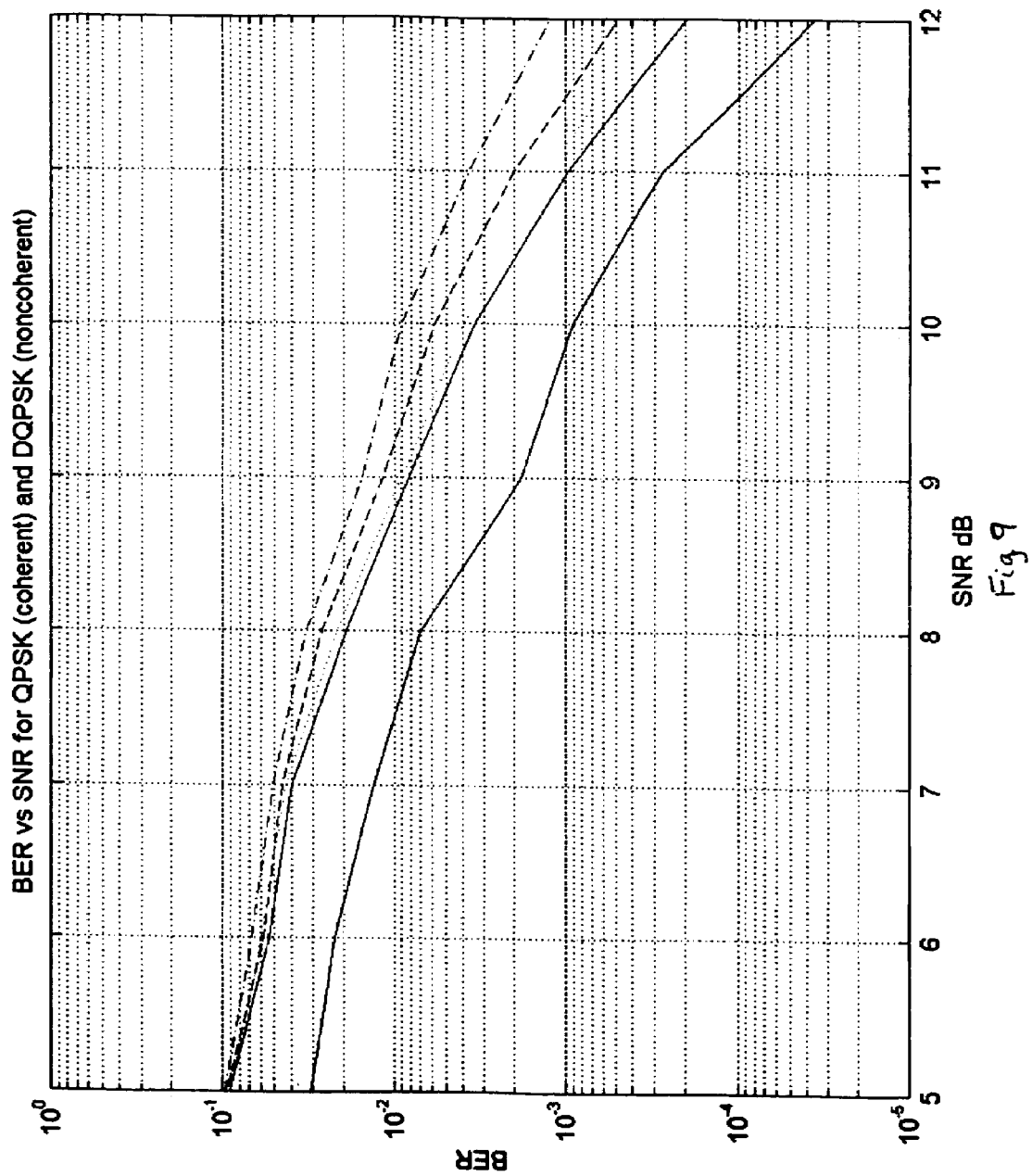
FIG. 9 is a graph showing results of a stochastic simulation of the algorithms of the invention, with the bit error rate (BER) plotted as a function of signal-to-noise ratio (SNR) for DQPSK modulation and noncoherent processing with 2, 3, 4, and 5-symbol intervals.

The DBPSK and DQPSK modulation techniques described above were simulated by means of stochastic simulation programs which were programmed to compare perfect coherent processing with noncoherent processing having different processing intervals according to the invention. Simulation results for DBPSK and DQPSK modulation techniques are shown in FIG. 8 and FIG. 9. More particularly, FIG. 8 shows the bit error rate (BER) as a function of signal-to-noise ratio (SNR) in dB for DBPSK modulation. The lowest (solid) curve corresponds to perfect coherent processing of the DBPSK signal, while the remaining curves (from top to bottom) correspond to noncoherent processing according to the invention with 2, 3, 4, and 5-symbol intervals.

At least two conclusions can be deduced from the simulation results. First, in the case of DBPSK there does not appear to be any reason to increase the processing interval beyond five symbols, because with 5-symbol interval the system already approximates minimum possible BER, which is approximately twice the BER for the perfect coherent processing of BPSK. This conclusion is illustrated in Table 8, which shows BER vs. SNR for BPSK with perfect coherent processing, DBPSK with perfect coherent processing, and DBPSK with 5-symbol noncoherent processing.

TABLE 8

BER vs. SNR for BPSK and DBPSK

| SNR dB | BER BPSK (Perfect Coherent) | BER DBPSK (5-symbol noncoherent) | BER DBPSK (Perfect Coherent) |
|---|---|---|---|
| 7.5 | 4.0 E–4 | 1.0 E–3 | 8.0 E–4 |
| 8.0 | 2.0 E–4 | 4.5 E–4 | 4.0 E–4 |
| 8.5 | 8.5 E–5 | 1.8 E–4 | 1.7 E–4 |

A second conclusion is that in the case of DBPSK the most considerable improvement takes place at the transition from 2-symbol processing to 3-symbol processing; it being evident from FIG. 8 that the dashed line of 2-symbol DBPSK is further away from the dashed line of 3-symbol DBPSK than the dashed line of 3-symbol DBPSK is from the dotted line of 4-symbol DBPSK. For example, at a BER of $4 \times 10^{-4}$, going from 2-symbol DBPSK to 3-symbol DBPSK yields a gain of slightly over 0.3 dB, whereas increasing from 3-symbol DBPSK even to 5-symbol DBPSK will yield a gain of only about another 0.1 dB. So, from a practical point of view, it may be desirable to use 3-symbol pilotless noncoherent processing for best performance gain with limited signal processing costs.

FIG. 9 shows the bit error rate (BER) as a function of signal-to-noise ratio (SNR) in dB for DQPSK modulation. The lowest solid curve corresponds to perfect coherent processing of the DQPSK signal, with the remaining curves (from top to bottom) corresponding to noncoherent DQPSK processing with 2, 3, 4, and 5-symbol intervals. As was the case for DBPSK, the most considerable improvement in DQPSK takes place when going from 2-symbol processing to 3-symbol processing. Further improvement decreases as the number of processing symbols increases. However, practically, 4 symbol processing is a good option for DQPSK modulation, because the gain is still rather significant between 3-symbol and 4-symbol processing. For example, at a BER of 7×10⁻³, going from 2-symbol processing (the top dashed line) to 3-symbol processing (the next dashed line) yields a gain of almost 0.5 dB. Going from 3-symbol processing (the second dashed line) to 4-symbol processing (the dotted line) yields a similar, albeit slightly smaller gain of over 0.4 dB. However, going from 4-symbol processing to 5-symbol processing yields only approximately 0.1 dB. Thus, 4-symbol DQPSK would appear to give the best performance gain relative to the additional complexity in processing.

There have been described and illustrated herein several embodiments of methods, apparatus, and systems for implementing non-coherent processing of pilotless telecommunication signals. While particular embodiments of the invention have been described, it is not intended that the invention be limited thereto, as it is intended that the invention be as broad in scope as the art will allow and that the specification be read likewise. Thus, while particular hardware and logic elements have been disclosed for implementing the invention, it will be appreciated that the invention could be implemented using different hardware and logic elements as well. In addition, the invention can be implemented with software and firmware as well. It will therefore be appreciated by those skilled in the art that yet other modifications could be made to the provided invention without deviating from its spirit and scope as claimed.

What is claimed is:

1. An N-symbol noncoherent demodulator for a differential phase shift keyed (DPSK) type telecommunications signals, comprising:

a) means for storing indications of quadrature components $X(q)$ and $Y(q)$ of N consecutive received symbols of the telecommunications signals, where q is an symbol index, and N is an integer equal to at least three;

b) processing means for processing said indications according to $$VX_{i+1}(k_1, k_2, \ldots, k_i) = VX_i(k_1, k_2, \ldots, k_{i-1}) + UX_{i+1}(k_1, k_2, \ldots, k_i)$$

$$VY_{i+1}(k_1, k_2, \ldots, k_i) = VY_i(k_1, k_2, \ldots, k_{i-1}) + UY_{i+1}(k_1, k_2, \ldots, k_i),$$

where i is an iteration index with $i=1,2,\ldots,N-1$, $k_i$ is an index of a phase differences between symbols with $k_i=1, 2, \ldots, M$, with M being the number of permissable phase transitions, and where $VX_{i+1}(k_1, k_2, \ldots, k_i)$ and $VY_{i+1}(k_1, k_2, \ldots, k_i)$ are quadrature components at the i-th iteration, such that $VX_1 = X(q-N+1)$, $VY_1 = Y(q-N+1)$ are quadrature components of the first received symbol in the sequence of said N consecutive symbols, and $UX_{i+1}(k_1, k_2, \ldots, k_i)$ and $UY_{i+1}(k_1, k_2, \ldots, k_i)$ are transforms of the received symbol at the i-th step according to $$UX_{i+1}(k_1, k_2, \ldots, k_i) = X(q-N+i+1)\cos[\Delta(k_1)+\ldots+\Delta(k_i)] + Y(q-N+i+1)\sin[\Delta(k_1)+\ldots+\Delta(k_i)]$$

$$UY_{i+1}(k_1, k_2, \ldots, k_i) = Y(q-N+i+1)\cos[\Delta(k_1)+\ldots+\Delta(k_i)] - X(q-N+i+1)\sin[\Delta(k_1)+\ldots+\Delta(k_i)];$$ and c) decision means for determining a current symbol based on a phase difference $\Delta(k_i)$ corresponding to a maximum length of vectors defined by a relationship utilizing $VX_{i+1}(k_1, k_2, \ldots, k_i)$ and $VY_{i+1}(k_1, k_2, \ldots, k_i)$.

2. A demodulator according to claim 1, wherein:
   said relationship is $[VX_{i+1}(k_1, k_2, \ldots, k_i)]^2 + [VY_{i+1}(k_1, k_2, \ldots, k_i)]^2$.

3. A demodulator according to claim 1, wherein:
   said means for storing indications comprises delay elements.

4. A demodulator according to claim 3, wherein:
   said delay elements comprise memory.

5. A demodulator according to claim 4, wherein:
   said memory comprises shift registers.

6. A demodulator according to claim 1, wherein:
   said processing means comprises a plurality of intersymbol processors, a first of said plurality of intersymbol processors generating two-symbol quadrature components $VX_2$ and $VY_2$ utilizing said quadrature components $X(q)$ and $Y(q)$ of a first two of said N consecutive received symbols, and a second of said intersymbol processors generating three-symbol quadrature components $VX_3$ and $VY_3$ utilizing said two-symbol quadrature components and a third of said N consecutive received symbols.

7. A demodulator according to claim 6, wherein:
   said plurality of intersymbol processors comprise N−1 intersymbol processors.

8. A demodulator according to claim 7, wherein N=3.

9. A demodulator according to claim 1, wherein:
   said differential phase shift keyed (DPSK) type telecommunications signals are differential quadrature phase shift keyed (DQPSK) telecommunications signals, and said phase differences $\Delta(k_i)$ are selected from a set of phase differences 0, $\pi/2$, $\pi$, and $3\pi/2$.

10. A demodulator according to claim 9, wherein:
    said processing means comprises table look up means and tables.

11. A demodulator according to claim 9, wherein:
    N=4.

12. A telecommunications receiver incorporating said N-symbol noncoherent demodulator of claim 1, and further comprising:
    a channel interface adapted to receive said DPSK type telecommunications signals;
    an in phase/quadrature (I/Q) detector coupled to said channel interface and to said noncoherent demodulator; and
    a decoder coupled to said decision means.

13. A telecommunications receiver according to claim 12, wherein:
    said DPSK type telecommunications signals are received by said channel interface on a single carrier, and said I/Q detector provides said indications of quadrature components $X(q)$ and $Y(q)$ to said noncoherent demodulator.

14. A telecommunications receiver according to claim 12, further comprising:
    Fourier transform means coupling said I/Q detector and said noncoherent demodulator, wherein
    said DPSK type telecommunications signals are received by said channel interface on multiple carriers, and said Fourier transform means provides said noncoherent demodulator with indications of quadrature components $X(q)$ and $Y(q)$ for each carrier.

15. A telecommunications receiver according to claim 12, wherein:
    said relationship is $[VX_{i+1}(k_1, k_2, \ldots, k_i)]^2 + [VY_{i+1}(k_1, k_2, \ldots, k_i)]^2$.

16. A telecommunications receiver according to claim 12, wherein:
    said processing means comprises a plurality of intersymbol processors, a first of said plurality of intersymbol processors generating two-symbol quadrature components $VX_2$ and $VY_2$ utilizing said quadrature components $X(q)$ and $Y(q)$ of a first two of said N consecutive received symbols, and a second of said intersymbol processors generating three-symbol quadrature components $VX_3$ and $VY_3$ utilizing said two-symbol quadrature components and a third of said N consecutive received symbols.

17. A telecommunications receiver according to claim 12, wherein:
said differential phase shift keyed (DPSK) type telecommunications signals are differential quadrature phase shift keyed (DQPSK) telecommunications signals, and said phase differences $\Delta(k_i)$ are selected from a set of phase differences $0$, $\pi/2$, $\pi$, and $3\pi/2$.

18. A method of demodulating differential phase shift keyed (DPSK) type telecommuncations signals, comprising:
a) storing indications of quadrature components $X(q)$ and $Y(q)$ of N consecutive received symbols of the telecommunications signals, where q is an symbol index, and N is an integer equal to at least three;
b) processing said indications according to $$VX_{i+1}(k_1, k_2, \ldots, k_i) = VX_i(k_1, k_2, \ldots, k_{i-1}) + UX_{i+1}(k_1, k_2, \ldots, k_i),$$

$$VY_{i+1}(k_1, k_2, \ldots, k_i) = VY_i(k_1, k_2, \ldots, k_{i-1}) + UX_{i+1}(k_1, k_2, \ldots, k_i),$$

where i is an iteration index with $i=1,2,\ldots,N-1$, $k_i$ is an index of a phase differences between symbols with $k_i=1, 2, \ldots, M$, with M being the number of permissable phase transitions, and where $VX_{i+1}(k_1, k_2, \ldots, k_i)$ and $VY_{i+1}(k_1, k_2, \ldots, k_i)$ are quadrature components at the i-th iteration, such that $VX_1 = X(q-N+1)$, $VY_1 = Y(q-N+1)$ are quadrature components of the first received symbol in the sequence of said N symbols, and $UX_{i+1}(k_1, k_2, \ldots, k_i)$ and $UY_{i+1}(k_1, k_2, \ldots, k_i)$ are transforms of the received symbol at the i-th step according to $$UX_{i+1}(k_1, k_2, \ldots, k_i) = X(q-N+i+1)\cos[\Delta(k_1)+\ldots+\Delta(k_i)] + Y(q-N+i+1)\sin[\Delta(k_1)+\ldots+\Delta(k_i)]$$

$$UY_{i+1}(k_1, k_2, \ldots, k_i) = Y(q-N+i+1)\cos[\Delta(k_1)+\ldots+\Delta(k_i)] - X(q-N+i+1)\sin[\Delta(k_1)+\ldots+\Delta(k_i)];$$ and c) determining a current symbol based on a phase difference $\Delta(k_i)$ corresponding to a maximum length of vectors defined by a relationship utilizing $VX_{i+1}(k_1, k_2, \ldots, k_i)$ and $VY_{i+1}(k_1, k_2, \ldots, k_i)$.

19. A method according to claim 18, wherein:
said relationship is $[VX_{i+1}(k_1, k_2, \ldots, k_i)]^2 + [VY_{i+1}(k_1, k_2, \ldots, k_i)]^2$.

20. A method according to claim 18, wherein:
said storing comprises storing said indications in memory.

21. A method according to claim 20, wherein:
said storing comprises storing said memory in shift registers.

22. A method according to claim 18, wherein:
said processing comprises processing with a plurality of intersymbol processors, a first of said plurality of intersymbol processors generating two-symbol quadrature components $VX_2$ and $VY_2$ utilizing said quadrature components $X(q)$ and $Y(q)$ of a first two of said N consecutive received symbols, and a second of said intersymbol processors generating three-symbol quadrature components $VX_3$ and $VY_3$ utilizing said two-symbol quadrature components and a third of said N consecutive received symbols.

23. A method according to claim 22, wherein:
said processing with a plurality of intersymbol processors comprises processing with N−1 intersymbol processors.

24. A method according to claim 23, wherein $N=3$.

25. A method according to claim 18, wherein:
said differential phase shift keyed (DPSK) type telecommuncations signals are differential quadrature phase shift keyed (DQPSK) telecommunications signals, and said phase differences $\Delta(k_i)$ are selected from a set of phase differences $0$, $\pi/2$, $\pi$, and $3\pi/2$.

26. A method according to claim 25, wherein:
said processing comprises utilizing tables.

27. A method according to claim 25, wherein: $N=4$.

28. A method of demodulating differential phase shift keyed (DPSK) type telecommuncations signals, comprising:
a) storing quadrature components $X(q)$ and $Y(q)$, $X(q-1)$ and $Y(q-1)$, $X(q-2)$ and $Y(q-2)$ of three consecutive symbols having indexes q, (q−1) and (q−2);
b) transforming quadrature components $X(q-1), Y(q-1)$ and $X(q-2), Y(q-2)$ into a set of 2-symbol quadrature components $VX_2$ and $VY_2$ using each possible phase difference $\Delta(k_1)$, where $k_1 = 1, 2, \ldots, M$;
c) transforming quadrature components $X(q)$ and $Y(q)$ of a current symbol having index q into a set of transforms $UX_3(k_1, k_2)$ and $UY_3(k_1, k_2)$ for each possible combination of phase differences $\Delta(k_1)$ and $\Delta(k_2)$, where $k_1 = 1, 2, \ldots, M$ and $k_2 = 1, 2, \ldots, M$;
d) obtaining sets of 3-symbol quadrature components $VX_3(k_1, k_2)$ and $VY_3(k_1, k_2)$ by combining results of said set of 2-symbol quadrature components $VX_2$ and $VY_2$ and said set of transforms $UX_3(k_1, k_2)$ and $UY_3(k_1, k_2)$;
e) using said 3-symbol quadrature components $VX_3(k_1, k_2)$ and $VY_3(k_1, k_2)$, finding a vector having a maximum length of vectors $[VX_3(k_1, k_2), VY_3(k_1, k_2)]$; and
f) making a decision relative to the current (q−th) symbol based on a phase difference of a set of differences $\Delta(k_2)$, where $k_2 = 1, 2, \ldots, M$, corresponding to said vector having a maximum length.

29. A method according to claim 28, wherein:
said transforming quadrature components $X(q-1), Y(q-1)$ and $X(q-2), Y(q-2)$ into a set of 2-symbol quadrature components $VX_2$ and $VY_2$ is accomplished according to $$VX_2(k_1) = X(q-2) + X(q-1)\cos[\Delta(k_1)] + Y(q-1)\sin[\Delta(k_1)],$$

$$VY_2(k_1) = Y(q-2) + Y(q-1)\cos[\Delta(k_1)] - X(q-1)\sin[\Delta(k_1)].$$

30. A method according to 28, wherein:
said transforming quadrature components $X(q)$ and $Y(q)$ of a current symbol having index q into a set of transforms $UX_3(k_1, k_2)$ and $UY_3(k_1, k_2)$ is accomplished according to $$UX_3(k_1, k_2) = X(q)\cos[\Delta(k_1)+\Delta(k_2)] + Y(q)\sin[\Delta(k_1)+\Delta(k_2)],$$

$$UY_3(k_1, k_2) = Y(q)\cos[\Delta(k_1)+\Delta(k_2)] - X(q)\sin[\Delta(k_1)+\Delta(k_2)].$$

31. A method according to claim 28, wherein:
said combining results comprises adding according to $$VX_3(k_1, k_2) = VX_2(k_1) + UX_3(k_1, k_2);$$

$$VY_3(k_1, k_2) = VY_2(k_1) + UY_3(k_1, k_2).$$

32. A method according to claim 28, wherein:

said finding a vector having a maximum length is found according to $$\text{Max}\{[VX_3(k_1, k_2)]^2 + [VY_3(k_1, k_2)]^2\}.$$

33. A method according to claim 29, wherein:

said transforming quadrature components X(q) and Y(q) of a current symbol having index q into a set of transforms $UX_3(k_1, k_2)$ and $UY_3(k_1, k_2)$ is accomplished according to $$UX_3(k_1, k_2) = X(q)\cos[\Delta(k_1) + \Delta(k_2)] + Y(q)\sin[\Delta(k_1) + \Delta(k_2)],$$

$$UY_3(k_1, k_2) = Y(q)\cos[\Delta(k_1) + \Delta(k_2)] - X(q)\sin[\Delta(k_1) + \Delta(k_2)],$$

said combining results comprises adding according to $$VX_3(k_1, k_2) = VX_2(k_1) + UX_3(k_1, k_2),$$

$$VY_3(k_1, k_2) = VY_2(k_1) + UY_3(k_1, k_2), \text{ and}$$

said finding a vector having a maximum length is found according to $$\text{Max}\{[VX_3(k_1, k_2)]^2 + [VY_3(k_1, k_2)]^2\}.$$

34. A method according to claim 28, wherein:

said transforming quadrature components X(q−1),Y(q−1) and X(q−2),Y(q−2) into a set of 2-symbol quadrature components comprises using a first intersymbol processor, and said transforming quadrature components X(q) and Y(q) of a current symbol and said obtaining sets of 3-symbol quadrature components comprises using a second intersymbol processor.

35. A method according to claim 28, wherein:

said differential phase shift keyed (DPSK) type telecommuncations signals are differential quadrature phase shift keyed (DQPSK) telecommunications signals, and said phase differences $\Delta(k_i)$ are selected from a set of phase differences 0, π/2, π, and 3π/2.

36. A method according to claim 35, wherein:

said transforming quadrature components X(q−1),Y(q−1) and X(q−2),Y(q−2) into a set of 2-symbol quadrature components, said transforming quadrature components X(q) and Y(q) of a current symbol having index q into a set of transforms $UX_3(k_1, k_2)$ and $UY_3(k_1, k_2)$, and said obtaining sets of 3-symbol quadrature components $VX_3(k_1, k_2)$ and $VY_3(k_1, k_2)$ comprises utilizing tables.

37. A method of demodulating differential phase shift keyed (DPSK) type telecommuncations signals, comprising:

a) storing quadrature components X(q), Y(q), X(q−1), Y(q−1), . . . , X(q−N+1), Y(q−N+1) of N consecutive symbols having indexes q, (q−1), . . . (q−N+1);

b) subjecting said quadrature components X(q),Y(q); X(q−1),Y(q−1); . . . ; X(q−N+1), Y(q−N+1) to a (N−1)-step transformation, where an i-th iteration of said (N−1)-step transformation, i=1,2, . . . , N−1, includes (1) calculating multi-dimensional transforms $UX_{i+1}(k_1, k_2, \ldots, k_i)$ and $UY_{i+1}(k_1, k_2, \ldots, k_i)$ of the current received components X(q−N+i+1) and Y(q−N+i+1) according to $$UX_{i+1}(k_1, k_2, \ldots, k_i) = X(q-N+i+1)\cos[\Delta(k_1) + \ldots + \Delta(k_i)] + Y(q-N+i+1)\sin[\Delta(k_1) + \ldots + \Delta(k_i)]$$

$$UY_{i+1}(k_1, k_2, \ldots, k_i) = Y(q-N+i+1)\cos[\Delta(k_1) + \ldots + \Delta(k_i)] - X(q-N+i+1)\sin[\Delta(k_1) + \ldots + \Delta(k_i)], \text{ and}$$

(2) calculating multi-dimensional components $VX_{i+1}(k_1, k_2, \ldots, k_i)$ and $VY_{i+1}(k_1, k_2, \ldots, k_i)$ according to $$VX_{i+1}(k_1, k_2, \ldots, k_i) = VX_i(k_1, k_2, \ldots, k_{i-1}) + UX_{i+1}(k_1, k_2, \ldots, k_i),$$

$$VY_{i+1}(k_1, k_2, \ldots, k_i) = VY_i(k_1, k_2, \ldots, k_{i-1}) + UY_{i+1}(k_1, k_2, \ldots, k_i),$$

where $k_i$ is an index of a phase differences between symbols with $k_i=1,2, \ldots, M$, with M being the number of permissable phase transitions; and c) making a decision relative to a current q-th symbol using a phase difference from the set of differences $\Delta(k_{N-1})$, where $k_{N-1}=1, 2, \ldots M$, corresponding to a vector having a maximum length among vectors $[VX_N(k_1, k_2, \ldots, k_{N-1}), VY_N(k_1, k_2, \ldots, k_{N-1})]$.

38. A method according to claim 37, wherein:

said subjecting said quadrature components to a (N−1)-step transformation comprises utilizing N−1 intersymbol processors.

39. A method according to claim 37, wherein:

said storing comprises storing in memory.

40. A method according to claim 37, wherein:

said storing comprises storing in shift registers.

41. A method according to claim 37, wherein:

said differential phase shift keyed (DPSK) type telecommuncations signals are differential quadrature phase shift keyed (DQPSK) telecommunications signals, and said phase differences $\Delta(k_i)$ are selected from a set of phase differences 0, π/2, π, and 3π/2.

42. A method according to claim 41, wherein:

said subjecting said quadrature components to a (N−1)-step transformation comprises utilizing processing comprises utilizing tables.

* * * * *